Nov. 14, 1967  F. A. OLSON ETAL  3,353,118
MAGNETOSTATIC WAVE VARIABLE DELAY APPARATUS
Filed May 19, 1964  4 Sheets-Sheet 2

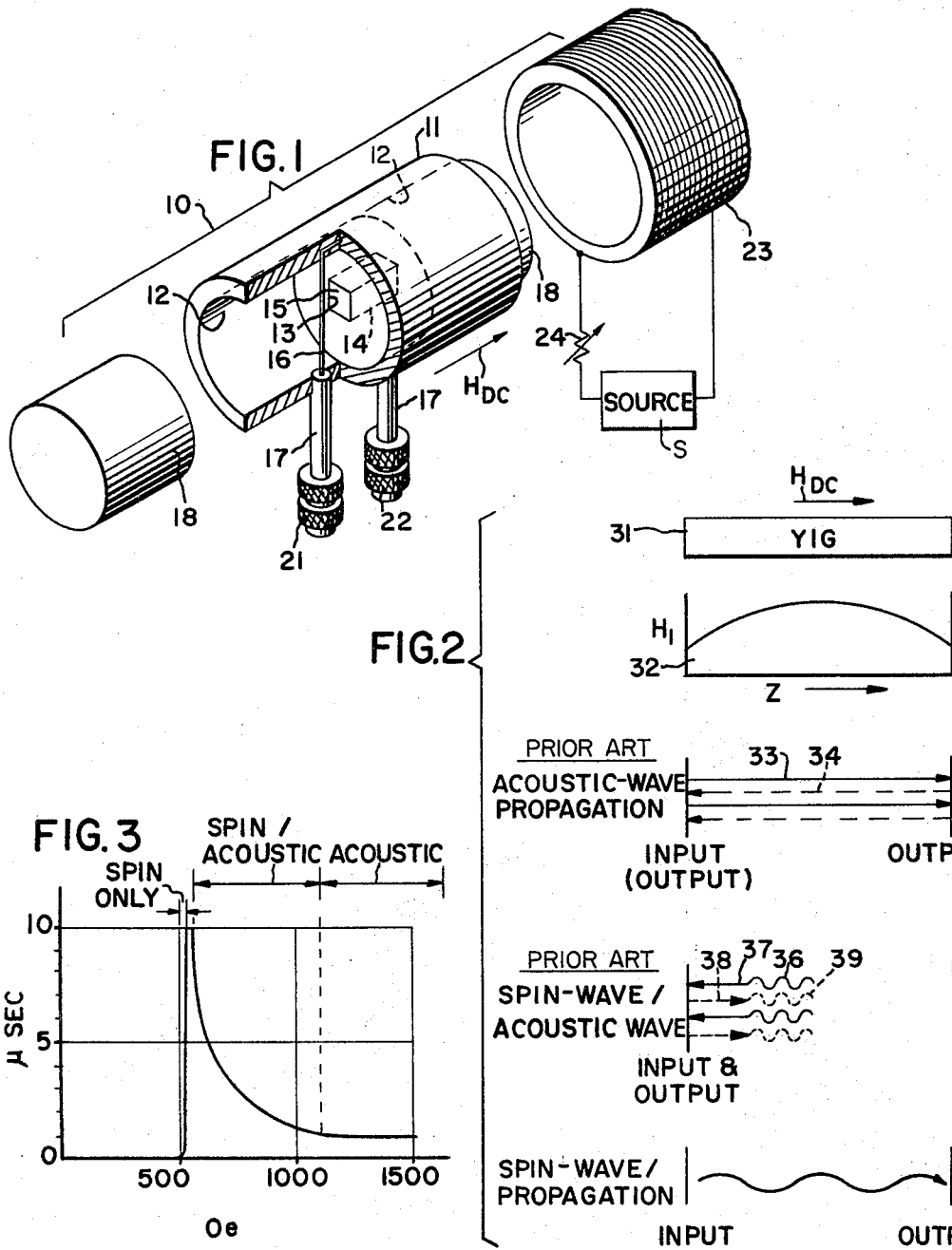

INVENTORS
FRANK A. OLSON
LYLE D. BUCHMILLER
JOHN R. YAEGER
BY Townsend and Townsend
ATTORNEYS

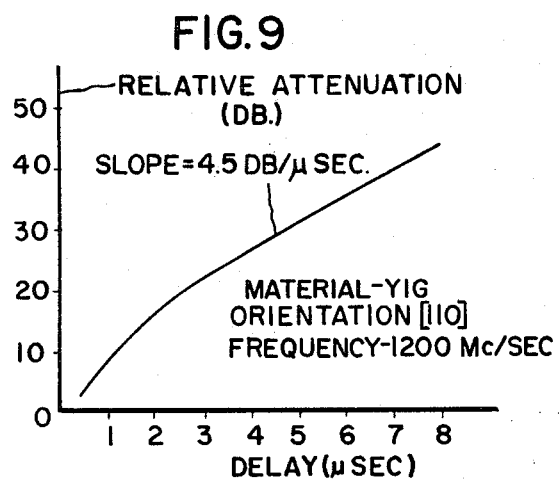
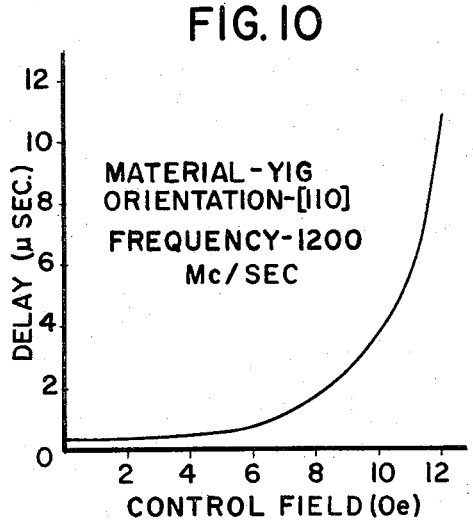
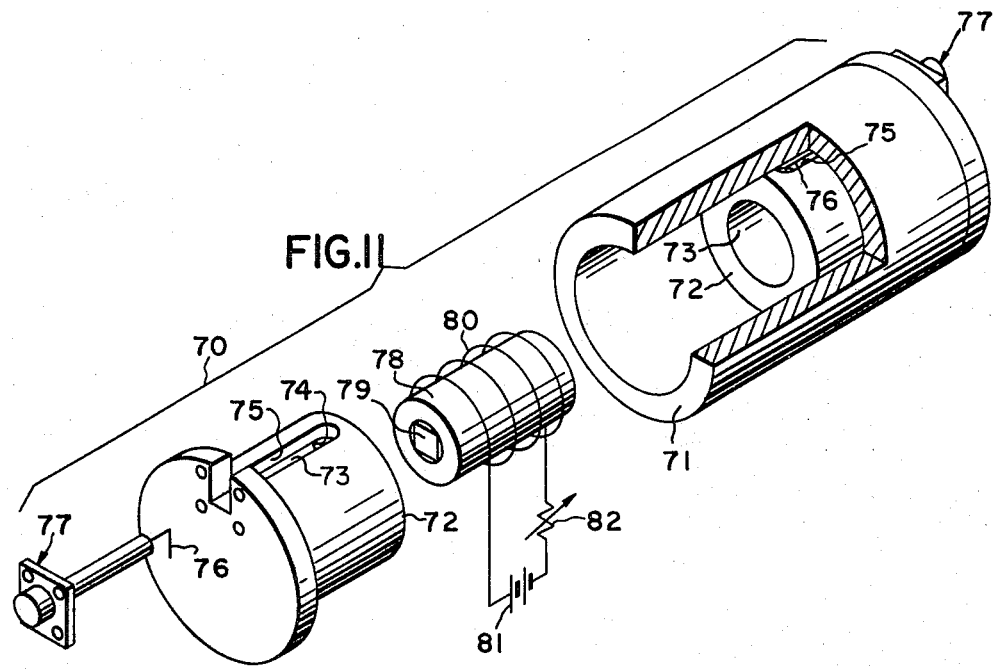

FIG. 12
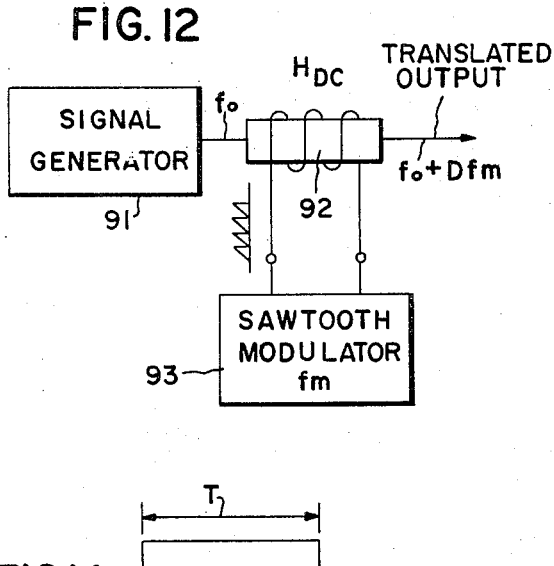
FIG. 13
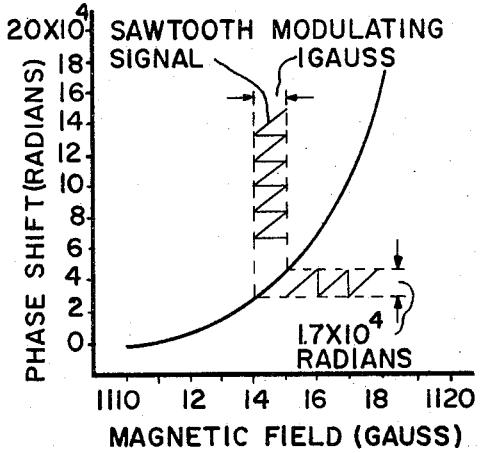
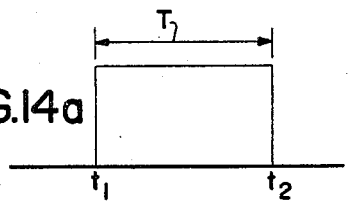
FIG.14a
ENVELOPE OF TRANSMITTED MICROWAVE PULSE
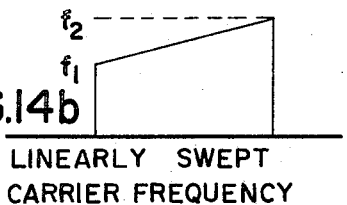
FIG.14b
LINEARLY SWEPT CARRIER FREQUENCY
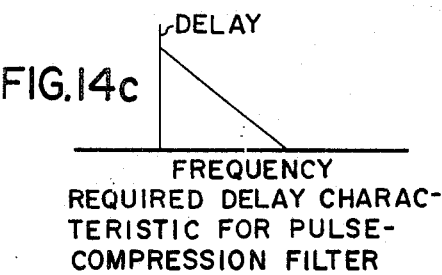
FIG.14c
FREQUENCY REQUIRED DELAY CHARACTERISTIC FOR PULSE-COMPRESSION FILTER
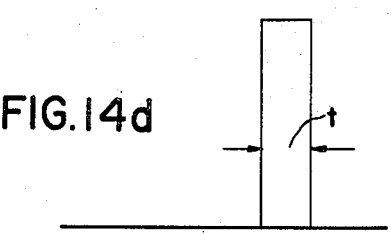
FIG.14d
OUTPUT FROM PULSE COMPRESSION FILTER
FIG. 15
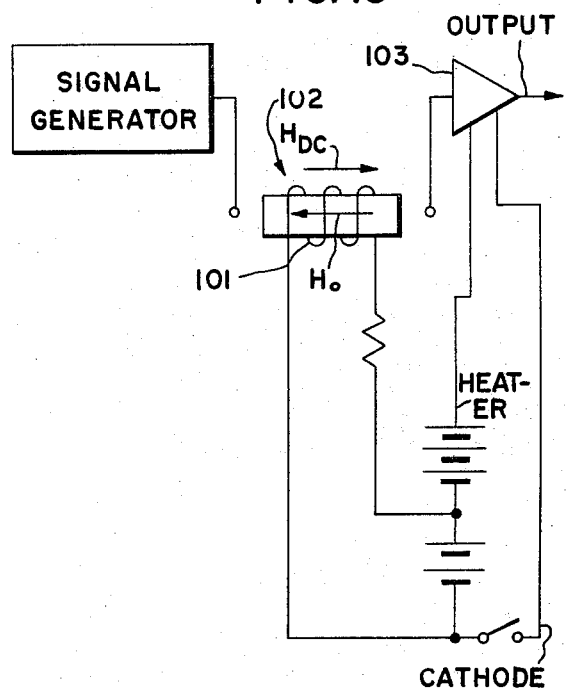
INVENTORS
FRANK A. OLSON
LYLE D. BUCHMILLER
JOHN R. YAEGER
BY *Townsend and Townsend*
ATTORNEYS

United States Patent Office 3,353,118
Patented Nov. 14, 1967

3,353,118
MAGNETOSTATIC WAVE VARIABLE
DELAY APPARATUS
Frank A. Olson, Palo Alto, Lyle D. Buchmiller, Menlo
Park, and John R. Yaeger, Palo Alto, Calif., assignors,
by mesne assignments, to Teledyne, Inc., Hawthorne,
Calif., a corporation of Delaware
Filed May 19, 1964, Ser. No. 368,545
10 Claims. (Cl. 332—29)

The present invention relates in general to a variable delay method and apparatus and more particularly to such method and apparatus wherein incremental changes in frequency or DC magnetic field applied to a ferrimagnetic material produce variations in the time delay of an electromagnetic wave directed to and received from the material.

It has previously been pointed out that low loss ferrimagnetic materials such as yttrium iron garnet, generally referred to in the art as YIG, can be utilized to delay electromagnetic waves such as microwave signals. In this regard, with a reasonably high steady state or DC magnetic field applied to YIG and with a microwave signal coupled to one end of the YIG, acoustic or elastic waves have been produced in the YIG and propagated to the other end of the YIG where an output microwave signal can be produced. The amount of delay between the input and output microwave signals is critically dependent upon the length of the YIG and when a particular length of YIG has been selected, a fixed delay is determined. In order to produce acoustic waves of this nature in YIG, it is not only necessary to have the ends of the YIG highly polished for production of the acoustic waves but also the end surfaces of the YIG must be maintained parallel. In the utilization of acoustic waves for producing fixed delay of the type described, reasonably high insertion loss is presented by the YIG, and due to the nature of the propagating waves in the YIG, reflections are created when the acoustic waves reach the ends of the YIG.

Another previously known type of delay utilizing YIG materials is the utilization of spin wave-acoustic wave propagation. This type of delay is accomplished by utilizing a lower DC magnetic field than that utilized for purely acoustic wave propagation. A microwave signal is coupled to one end of a YIG to set up spin waves internally in the YIG. These spin waves induce acoustic waves which in turn generate spin waves which produce an output microwaves signal at the same end of the YIG as the input signal. By varying the strength of the DC magnetic field over a relatively large range, it is possible to vary the amount of delay produced with this spin wave-acoustic wave propagation upwards from a certain minimum delay necessary for the acoustic wave-spin wave conversion process which is on the order of one microsecond. As in the pure acoustic wave propagation device, the common input and output end of the YIG must be highly polished, but the insertion loss of the YIG is somewhat lower than that characteristic of pure acoustic wave propagation. One of the disadvantages of this spin wave-acoustic wave delay structure lies in the fact that with the input and output at the same end of the YIG, it is difficult to obtain the delay signal in an output circuit without the initial input signal being present.

The present invention is directed to a variable delay method and apparatus utilizing pure spin wave propagation. The invention achieves variable delay by the utilization of a DC magnetic field lower than that utilized for pure acoustic wave or spin wave-acoustic wave propagation. When this lower critical field is applied to the YIG, microwave signals can be coupled to one end of the YIG to produce long wavelength spin waves which are highly dispersive so that pronounced changes in the group velocity of the spin waves can be achieved with incremental changes in signal frequency or DC magnetic field strength.

One of the advantages of this invention lies in the fact that these small incremental changes can produce a relatively large delay variation contrasted with the fixed delay produced by spin wave-acoustic wave propagation variable only with large variations in the magnetic field. Additionally, the requisite magnetic field to produce the delay is far less when utilizing pure spin wave propagation than with other propagation methods thereby permitting use of a smaller magnet with its attendant advantages.

Also in the production of variable delay utilizing pure spin wave propagation, highly polished end surfaces are not required on the YIG and less insertion loss is encountered than with the other delay methods described above.

A still further advantage of the present invention has been the discovery that, with pure spin wave propagation, the delay can be varied from zero to positive values, which is not possible with the other types of delay mentioned above.

With the present invention, when variable delay is produced by a variation in the DC magnetic field, the variation in field can be produced by varying the field of a single magnet or, since only incremental changes in the field are necessary to produce large delays, one magnet can be provided to establish the requisite DC magnetic field and another magnet utilized to estabilsh the incremental changes in the DC magnetic field. With this latter construction, the operating parameters which are changed in order to produce the variation in the DC magnetic field are relaxed to a considerable degree.

As an additional feature of the present invention, a continuous linear phase modulating signal can be applied to the magntiude of the DC magnetic field on the YIG to produce phase excursions of thousands of degrees, thereby to shift the frequency of the propagated wave thousands of megacycles. Since the frequency translation or shift is proportional to the product of the radian phase shift and the frequency of the modulating signal, extremely large frequency translations can be achieved and thus the YIG utilized as a signal generator.

A still further feature of the present invention is the utilization of a linearly swept carrier frequency signal applied to a highly dispersive ferrimagnetic material for the production of an output electromagnet signal by means of pure spin wave propagation. Due to the high dispersion the input signal pulse can be compressed to produce a much shorter output signal.

While the attenuation of a variable delay structure in accordance with the present invention increases with increased delay, a system with an output signal substantially uniform over a broad range of delay is accomplished with the present invention by coupling the delay apparatus with a signal amplifier such that the variation in frequency or field to produce variations in the delay is coupled to a corrresponding variation in the gain of the amplifier.

Other objects of the present invention will become apparent upon reading the following specification and referring to the accompanying drawings in which similar characters of reference represent corresponding parts in each of the several views.

FIG. 1 is a schematic perspective view of apparatus for accomplishing the present invention;

FIG. 2 is a schematic representation of the operation of the present invention and contrasted with the operation of prior art;

FIG. 3 is a graph of time delay plotted versus magnetic field strength for the present invention and prior art;

FIG. 9 is a graph of relative attenuation plotted versus the delay;

FIG. 10 is a graph of delay plotted versus control field for a typical example utilizing the present invention;

FIG. 11 is an exploded view of an alternative embodiment of the present invention;

FIG. 12 is a schematic view of a still further embodiment of the present invention;

FIG. 13 is a graph of phase shift versus magnetic field illustrating operation of the arrangement illustrated in FIG. 12;

Figure 4:
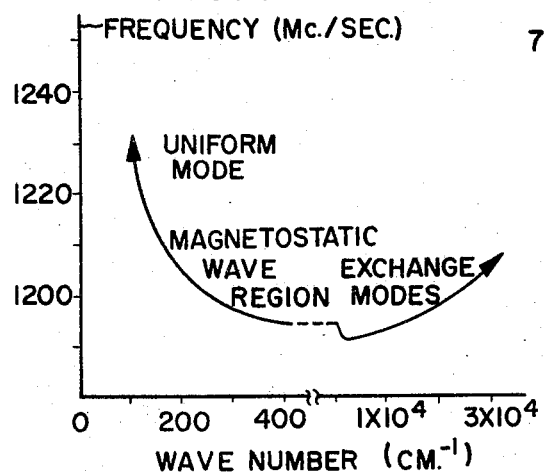
FIG. 4 is a graph of frequency versus wave number.

FIGS. 14a, 14b, 14c, and 14d are schematic views illustrating different parameters of a system utilizing the present invention; and FIG. 15 is a schematic circuit diagram illustrating still another utilization of the present invention.

Referring now to the drawings with particular reference to FIGURE 1 there is shown a variable delay apparatus 10 including a housing 11 of, for example, brass having axial bores 12 extending inwardly of the cylinder from the opposite ends thereof. Centrally of the housing 11 between the inner ends of the bores 12 the housing is provided with a bore 13 of lesser radial dimension than bores 12. A piece of low loss ferrimagnetic material such as, for example, single crystal yttrium iron garnet 14 commonly known as YIG is mounted in the bore 13 with each of its ends 15 facing one of the open bores 12.

Closely spaced from each of the YIG ends 15 is a coupling wire 16 which extends from one side of the bore 12, across the YIG end 15 to the other side of the bore where the wire is attached to the center conductor of a coaxial line 17. Each of the bores 12 is closed by a cylindrical plug 18 which extends into the housing 12 so that its inner end lies adjacent the coupling wire 16.

A signal to be delayed is coupled from a source (not shown) via an input line 21 to one of the coaxial lines 17 and the output signal from the variable delay apparatus 10 is coupled via the other coaxial line 17 through an output line 22 to a load (not shown). A steady state or DC magnetic field is produced axially of the YIG 14 from the input end to the output end by means of a solenoid 23. The direction of this field is generally indicated in FIG. 2 by the arrow noted $H_{dc}$ and the strength of the field of the solenoid 23 is varied by adjusting the current from source S through the coil in any conventional manner such as schematically illustrated at 24.

Figure 6:
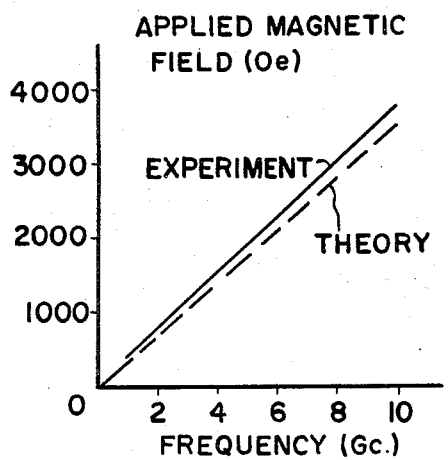
FIG. 6 is a graph of applied magnetic field plotted versus frequency for a specific time delay.

It has been discovered that when an electromagnetic wave such as, for example, a microwave signal, is applied to the input line 21 of the variable delay apparatus, and the magnetic field $H_{dc}$ set within critical ranges, small adjustments in the magnetic field strength by means of field adjustment 24 produce delays in the microwave signal appearing at the output line 22 from zero to a number of microseconds such as on the order of 10–12. The critical range of DC magnetic field is determined from the equation $$H = \frac{\omega}{\gamma}$$

where H is the strength of the DC magnetic field in oersteds, $\gamma$ is the gyromagnetic ratio which for YIG is approximately 2.8 and $\omega$ is the frequency of the input signal in megacycles. This relationship is shown in FIG. 6. The incremental changes in the field necessary to produce delays on the order of several microseconds are only a fractional percentage of the total steady state or DC field and are on the order of several oersteds for microwave signals.

The variable delay produced and observed in accordance with the present invention is achieved due to the high dispersion of the ferrimagnetic material of YIG when long wavelength spin waves are propagated through the YIG. From measurements of transmission time, performed at room temperature and at microwave frequencies, the group velocity and dispersion characteristics of the long wavelength spin waves or magnetostatic waves YIG rods have been established. The propagation mode is a backward wave, i.e., the phase and group velocities are of opposite direction and the waves are highly dispersive resulting in pronounced changes in group velocity with incremental changes in frequency or DC magnetic field.

Figure 5:
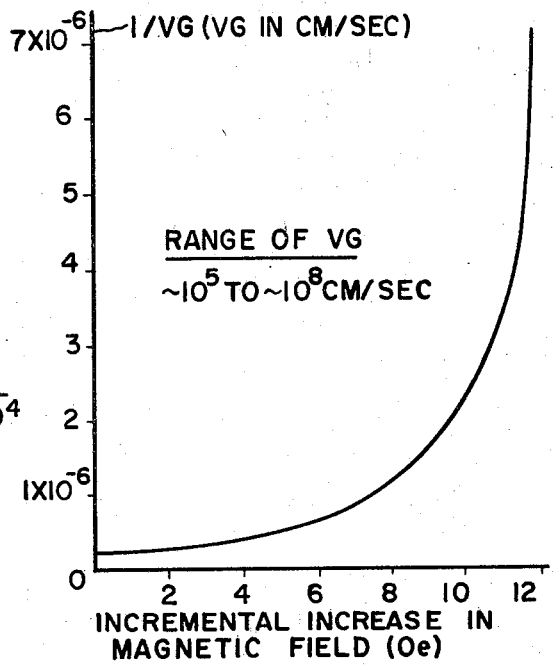
FIG. 5 is a graph of the reciprocal of the group velocity versus incremental increase in magnetic field.
Figure 8:
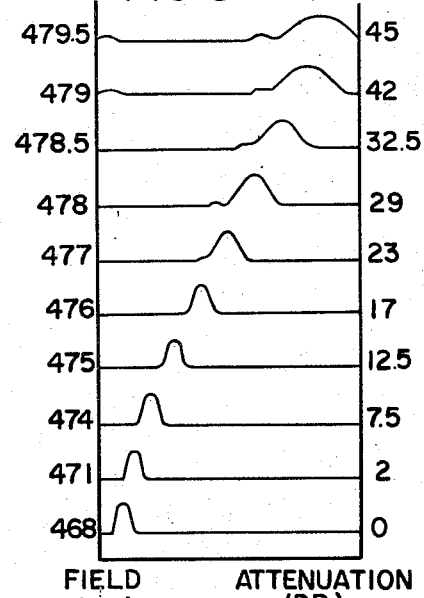
FIG. 8 is a graph showing a number of different pulses delayed in accordance with the present invention and the attenuation of the respective delayed pulses.

The high dispersive character of the observed magnetic modes follows the equation set forth in the article entitled "Considerations on the Propagation and Generation of Magnetostatic Waves and Spin Waves" by P. C. Fletcher and C. Kittel in Physical Review, volume 120, page 2004 (1960). For a ferrimagnetic cylinder of infinite length, the dispersion relation for magnetostatic waves and spin waves propagating along the rod axis using the lowest root is $$\omega - \gamma H_i \cong \gamma 2\pi M_s \left(\frac{2.405}{kR}\right)^2 + \frac{D}{\hbar} k^2$$

where $\omega$ is the input signal frequency, $\gamma$ is the gyromagnetic ratio of the ferrimagnetic material, $H_i$ is the internal field, $M_s$ is the saturation magnetization, $k$ is the wave number, R is the cylinder radius, D is the exchange constant, and $\hbar$ is Planck's constant divided by $2\pi$. The group velocity, $V_g$ has been calculated from this expression for the experimental conditions. The relationship between $\omega - \gamma H_i$ expressed in mc./sec., and $1/V_g$, the reciprocal of the group velocity, is shown in FIG. 5. The dispersion curve for magnetostatic waves and spin waves is calculated from the equation above as shown in FIG. 4. At large wave numbers the curve is the familiar spin wave dispersion characteristic associated with exchange interaction. At wave numbers less than about $3 \times 10^3$ cm.$^{-1}$ the curve represents magnetostatic modes, and at very small wave numbers the curve tends toward the uniform precession modes. Experimental results, corresponding to the conditions of FIG. 8 are also shown in the dispersion diagram in FIG. 4. The fit of the data further substantiates that the transmission through the YIG sample is due to magnetostatic waves (wave numbers in the region from $1 \times 10^2$ to $4 \times 10^2$ cm.$^{-1}$ which propagate as highly dispersive backward waves.

Operation of the present invention will be described with reference to FIG. 2 which is a schematic illustration of the propagation through the YIG in accordance with both the prior art methods and structures and in accordance with the present invention. In the schematic illustration the length of the YIG is represented at 31 with a steady state magnetic field $H_{dc}$ directed from its first end to its second end. A graph at 32 illustrates the variation in the internal magnet field $H_i$ over the length Z of the YIG. As practiced in the prior art as described above, fixed delay can be achieved in the YIG by coupling electromagnetic wave energy to a polished input end of the material to produce acoustic wave propagation represented by line 33 extending from the input end to the output end of the YIG. Acoustic wave propagation takes place at a relatively high magnetic field, such as 1100 oersteds or greater for an input signal of 1.3 gc. An output signal is produced at the other polished end of the YIG (or at the input end if reflections are utilized) and the ends of the YIG must be maintained parallel to one another. The delay produced by the YIG is determined by the length of the YIG and does not change with changes in magnetic field although, due to reflections 34, echoes of the signal are produced at fixed intervals, again dependent upon the length of the YIG.

Insertion losses in producing the first signal pulse with an acoustic wave and an input microwave signal are on the order of approximately 45 db with a bandwidth of 25% utilizing a structure as described above although these losses can be reduced to approximately 30 db using cavity coupling with attendant loss in bandwidth to a level on the order of 0.1%. Because of the high coupling losses, reflections are produced at the ends of the YIG so that a signal can be stored by the YIG.

If a lower DC magnetic field is utilized, a variable delay can be achieved with spin wave-acoustic wave propagation with the input and output signals at the same end of the YIG. For example, with an input signal of 1.3 gc. and a magnetic field $H_{dc}$ on the order of 550–1100 oersteds a variable delay can be produced from a delay of 1 microsecond to several microseconds with a large variation in the magnetic field. In accordance with this prior art delay method, when a microwave signal is applied to a polished end of a YIG, spin waves 36 are produced which generate acoustic waves 37 in the YIG and reflections 38 of these acoustic waves 37 propagating in the YIG generate other spin waves 39 which produce an output signal at the input end surface of the YIG.

With spin wave-acoustic wave propagation, typical coupling losses utilizing the illustrated coupling structure are on the order of 37 db which can be reduced to 25 db utilizing the cavity coupling as described above. It has been discovered that variable delays on the order of from 1 to 10 microseconds can be produced by large changes in the magnetic field but due to the necessity for first establishing spin waves and then acoustic waves and then spin waves, it does not appear possible to obtain delays of less than 1 microsecond with this process. This process does permit tuning of 3:1 but since both the input and output are at the same end of the YIG, it becomes difficult to avoid leakage of the input signal into the output circuit.

In the method according to the present invention with low magnetic fields such as 505–515 oersteds for a signal frequency of 1.3 gc. long wavelength spin waves, referred to herein as magnetostatic waves, are produced in the YIG. The microwave signal on the coupling wire 16 establishes a strong transverse magnetic field normal to the axis of the YIG and to the DC magnetic field to establish resonance near the end of the YIG for spin wave propagation to the opposite end of the YIG at which an output electromagnetic wave is established. Since the ends of the YIG are poor magnetic reflectors the spin waves do not reflect back toward the input end. By incremental changes in the strength of the DC magnetic field such as several oersteds, the delay between the input and output signals can be varied from zero up to on the order of 10–12 microseconds. Utilizing pure spin wave propagation in this manner to produce variable delay, the coupling loss is on the order of 30 db utilizing the coupling arrangement illustrated, and again the coupling loss can be reduced to on the order of 20 db utilizing cavity coupling.

It has been discovered with the present invention that the end surfaces of the YIG need not be polished as is required in the prior art methods of producing delay. Additionally, neither the cross section nor the orientation of the YIG crystal have been found to be critical. For example, a variety of samples have been tested utilizing both rectangular and circular cross sections and with the orientation of the YIG crystal along the [100], [110] and [111] axes with substantially the same operational characteristics. However, apparently the YIG must be a single crystal since no output signal has been observed with polycrystalline structures.

While the present invention is specifically described with reference to YIG, other low loss ferrimagnetic materials with similar characteristics can be utilized for producing the variable delay described.

The statement that delays from zero on up can be produced is based on the fact that with measuring equipment for measuring delays having a sensitivity at least as great as 0.1 microsecond, no delay was apparent with critical DC magnetic field strengths.

While the invention has been described above with particular emphasis upon variation in delay produced by a variation in the DC magnetic field, the same appropriate delay can be produced when holding the magnetic field constant and changing the frequency since the dispersion characteristics of the YIG material when propagating magnetostatic waves or long wavelength spin waves are related by the equation given above. Utilization of this feature of the present invention will be employed with reference to FIG. 14 described below.

FIG. 3 is a graph of delay in microseconds plotted against DC magnetic field strength for an L frequency band microwave signal and illustrating a comparison between possible delays produced with pure spin wave propagation, spin acoustic wave propagation and pure acoustic wave propagation as the DC magnetic field is increased. The high dispersion for pure spin waves is quite evident between about 505 and 520 oersteds.

FIG. 6 is a plot of applied magnetic field in oersteds versus frequency in gc.'s for the production of two microseconds delay with the structure of FIG. 1.

Figure 7:
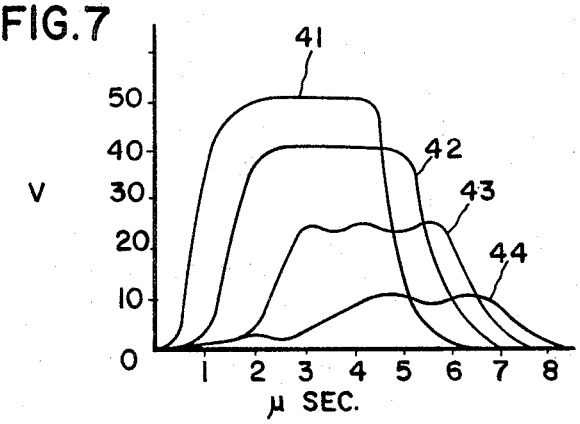
FIG. 7 is a graph showing the actual delay of several microwave pulses utilizing the present invention.

FIG. 7 is a multiple exposure of an oscilloscope picture showing the delay of a three microsecond pulse as a function of applied DC magnetic field for a signal of 1.4 gc. using a vertical scale graduated in ten volt units and a horizontal scale graduated in one microsecond units for a structure as shown in FIG. 1. From trace 41 the field was increased by successive increments to produce the successively attenuated curves 42, 43 and 44 which had successively increased delay times. The deterioration of the pulse shape results from the increased dispersion higher on the dispersion curve.

FIG. 8 shows successive oscilloscope traces for a signal of 1194 mc. applied to the structure shown in FIG. 1 and showing the amount of delay resultant from different field values and the amount of attenuation resultant from the increasing delay. The full length of the abscissa shown in terms of time is 10 microseconds.

FIG. 9 is a graph illustrating the relative attenuation plotted versus delay in one experiment.

FIG. 10 is a graph of delay plotted versus the field control utilizing a control field of 0–12 oersteds on a bias magnetic field of 480 oersteds for the structure of FIG. 1.

Referring now to FIG. 11, there is shown an alternative variable delay structure 70 including a hollow cylindrical permanent magnet 71 into the ends of which are inserted identical plug members 72 of, for example, brass which are provided at their interior ends with stepped diameter bores 73. An aperture 74 is provided in the side of each plug 72 for providing communication into the bore 73 from a longitudinal slot 75 extending from the exterior end of the plug. A coupling probe 76 extends from one side of the reduced diameter portion of the bore 73 through the aperture 74 and is connected to a coaxial connector generally indicated as 77.

Into the enlarged diameter portions of the bores 73 is inserted a sleeve 78 of, for example, brass in which is supported an axially aligned ferrimagnetic member such as YIG 79. A coil 80 is wound around the sleeve 78 for producing variations in the magnetic field of the permanent magnet 71 in response to changes in current from a source 81 through a variable resistor 82.

An input signal coupled in one of the coaxial connectors 72 establishes pure spin wave propagation in the YIG to produce an output signal in the other coaxial connection 77. Small variations of current such as, for example, on the order of 50 milliamps, in the coil 80 are sufficient to change the magnetic field axially of the YIG 79 for producing variable delay of 0–12 microseconds.

Obviously other mechanical device such as field distorting shims and probes of magnetic material can be used to vary the steady state bias magnetic field on the YIG to produce the desired amount of delay.

As another embodiment of the present invention illustrated in FIG. 12, a signal from a signal generator 91 applied to a variable delay apparatus schematically illustrated as 92 can be phase modulated by application of a small saw-tooth modulting signal $f_m$ from a modulator 93 to the magnetic field surrounding the YIG to produce a translated output signal $f_o + Df_m$. As illustrated by the graph shown in FIG. 13, when modulating a microwave signal with a phase modulating signal having an amplitude of only 1 oersted, the propagating signal experiences phase excursions of thousands of degress to produce frequency translations of thousands of megacycles. For an input frequency of 3 gc. illustrated in the graph the output frequency from the translator 92 is 20 gc.

As an additional feature of the present invention, the variable delay method and apparatus can be utilized to produce a tunable pulse compression filter to perform the type of job presently delegated to large racks of fixed tuned passive filters. This aspect of the present invention is accomplished by linearly sweeping a microwave pulse such as shown in FIG. 14a in the manner illustrated in FIG. 14b. When the microwave pulse with this linear frequency sweep is passed through a highly dispersive filter such as the variable delay apparatus shown in FIGS. 1 or 11, with the delay characteristics generally as shown in FIG. 14c, the output pulse shape is compressed as indicated in FIG. 14d. This produces at the output of the pulse compression filter a pulse of narrower width and greater peak amplitude.

As still an additional feature of the present invention, while the insertion loss of the YIG material in the variable delay apparatus such as illustrated in FIGS. 1 and 11 increases with increasing delay, the variable delay apparatus can be coupled with a signal amplifier the gain of which is increased as the amount of delay is increased thereby to compensate for increased insertion loss and produce a substantially level output signal over the entire variable delay range. Such a construction is illustrated in FIG. 15 in which the auxiliary coil 101 in the variable delay structure, generally indicated as 102, is connected in the circuit of an amplifier 103 such as a traveling wave tube which is provided in the output line from the variable delay structure 102. With the circuit controlling the field of coil 101 connected in the circuit between the helix and cathode of the traveling wave tube, the gain of the traveling wave tube will be increased to compensate for increased insertion loss of the YIG when the delay in the variable delay structure is increased.

Although the foregoing invention has been described in some detail by way of illustration and example for purposes of clarity of understanding, it is understood that certain changes and modifications may be practiced within the spirit of the invention as limited only by the scope of the appended claims.

It is claimed:

1. A variable delay apparatus comprising: a housing; a single crystal ferrimagnetic rod mounted in said housing, serving as the transmission medium and having a first end and a second end; means for coupling an input electromagnetic wave to said first end of said rod; means for coupling an output electromagnetic wave from said second end of said rod; means for establishing a magnetic field longitudinally of said rod from said first end to said second end thereof to produce long wavelength spin waves in said rod in response to said input electromagnetic wave and in turn produce an output electromagnetic wave at said second end of said rod with said spin waves; and means for changing the strength of said magnetic field to change the time delay between said input electromagnetic wave coupled to said first end of said rod and said output electromagnetic wave coupled from said second end of said rod.

2. A variable delay apparatus comprising: a housing; a single crystal ferrimagnetic garnet member mounted in said housing, serving as the transmission medium and having a first end and a second end; means for coupling an input electromagnetic wave to said first end of said garnet; means for coupling an output electromagnetic wave from said second end of said garnet; means for establishing a magnetic field longitudinally of said garnet from said first end to said second end thereof to produce magnetostatic waves in said garnet in the presence of an input electromagnetic wave and thereby produce an output electromagnetic wave at said second end of said garnet; and means for changing the strength of said magnetic field to change the time delay between said input electromagnetic wave coupled to said first end of said garnet and said output electromagnetic wave coupled from said second end of said garnet.

3. A variable delay apparatus comprising: a housing; a single crystal ferrimagnetic rod member mounted in said housing, serving as the transmission medium and having a first end and a second end; means for coupling an input electromagnetic wave to said first end of said rod; means for coupling an output electromagnetic wave from said second end of said rod; a magnetic field extending longitudinally of said rod from said first end to said second end of said rod for producing spin waves in said rod in the presence of an input electromagnetic wave and thereby produce an output electromagnetic wave at said second end of said rod, the strength of said magnetic field being substantially of a level determined by the relation $$H = \frac{\omega}{\gamma}$$

where H is the strength of said magnetic field in oersteds, $\gamma$ is the gyromagnetic ratio of the rod and $\omega$ is the frequency of said input electromagnetic wave; and means for changing the strength of said magnetic field by a small percentage.

4. A variable delay apparatus comprising: a housing; a single crystal ferrimagnetic rod member mounted in said housing, serving as the transmission medium and having a first end and a second end; means for coupling an input electromagnetic wave to said first end of said rod; means for coupling an output electromagnetic wave from said second end of said rod; a first magnet for establishing a steady state magnetic field longitudinally of said rod from said first end to said second end for producing spin waves in said rod in the presence of an input electromagnetic wave and thereby produce an output electromagnetic wave at said second end of said rod; and a second magnet for establishing incremental changes in the strength of said steady state magnetic field.

5. A variable delay apparatus comprising: a housing; a yttrium iron garnet member mounted in said housing, serving as the transmission medium and having a first end and a second end; means for coupling an input microwave electromagnetic wave to said first end of said garnet; a magnetic field extending longitudinally of said garnet from said first end to said second end of said garnet for producing magnetostatic spin waves in said garnet in the presence of said input electromagnetic wave and thereby produce an output electromagnetic wave at said second end of said garnet, the strength of said magnetic field being substantially of a level determined by the relation $$H = \frac{\omega}{\gamma}$$

where H is the strength of said magnetic field in oersteds, $\gamma$ is the gyromagnetic ratio of said garnet and $\omega$ is the frequency of said input electromagnetic wave; and means for changing the strength of said magnetic field in small incremental amounts thereby to produce a variable delay between said input electromagnetic wave coupled to said first end of said garnet and said output electromagnetic wave coupled from said garnet.

6. A signal generator comprising: a housing; a single crystal ferrimagnetic rod mounted in said housing, serving as the transmission medium and having a first end and a second end; means for coupling an input electromagnetic wave to said first end of said rod; means for coupling an output electromagnetic wave from said second end of said rod; means for establishing a magnetic field longitudinally of said rod from said first end to said second end thereof to produce spin waves in said rod in response to said input electromagnetic wave and means for modulating the strength of said magnetic field thereby to generate at said output end of said rod an electromagnetic wave of a frequency shifted substantially from the frequency of said input electromagnetic wave.

7. A variable delay apparatus comprising: a housing; a single crystal ferrimagnetic rod mounted in said housing, serving as the transmission medium and having a first end and a second end; means for coupling a linearly swept frequency input electromagnetic pulse to said first end of said rod; means for coupling an output electromagnetic pulse from said second end of said rod; and means for establishing a magnetic field longitudinally of said rod from said first end to said second end thereof to produce spin waves in said rod in response to said input electromagnetic pulse and in turn produce an output electromagnetic pulse at said second end of said rod with said spin waves; said output electromagnetic pulse having a time duration shorter than the time duration of said input electromagnetic pulse.

8. A variable delay apparatus comprising: a housing; a single crystal ferrimagnetic rod mounted in said housing, serving as the transmission medium and having a first end and a second end; means for coupling an input electromagnetic wave to said first end of said rod; a signal amplifier; means for coupling an output electromagnetic wave from said second end of said rod to said amplifier; means for establishing a magnetic field longitudinally of said rod from said first end to said second end thereof to produce magnetostatic waves in said rod in response to said input electromagnetic wave, and in turn produce an output electromagnetic wave at said second end of said rod with said spin waves; means for changing the strength of said magnetic field to change the time delay between said input electromagnetic wave coupled to said first end of said rod and said output electromagnetic wave coupled from said second end of said rod; and means for changing the gain of said signal amplifier in response to an increased time delay between said input and output waves.

9. A variable delay apparatus comprising a single crystal ferrimagnetic material; means for magnetically aligning portions of said material with a magnetic field of a strength for producing magnetostatic waves in said material upon application of an electromagnetic wave to said material; means for coupling an input electromagnetic wave to said material to generate magnetostatic waves in said material for propagating said magnetostatic waves in said material; means for coupling from said material an output electromagnetic wave generated by such magnetostatic waves; and means for varying the strength of said magnetic field to vary the velocity of propagation of the magnetostatic waves in said material.

10. Apparatus for producing shortened electromagnetic pulses comprising a single crystal ferrimagnetic material; means for magnetically aligning portions of said material with a magnetic field of a strength for producing magnetostatic waves in said material upon application of an electromagnetic pulse to said material; means for coupling an input electromagnetic pulse to said material to generate magnetostatic waves in said material for propagating said magnetostatic waves in said material; means for coupling from said material an output electromagnetic wave generated by said magnetostatic waves; and means for sweeping the frequency of the input electromagnetic pulse whereby the output pulse has a time duration different from said input pulse.

References Cited

UNITED STATES PATENTS

| | | | |
|---|---|---|---|
| 3,072,869 | 1/1963 | Seidel | 332—51 X |
| 3,235,819 | 2/1966 | Carvelas et al. | 332—51 |
| 3,258,703 | 6/1966 | Moore | 333—1.1 X |

ROY LAKE, *Primary Examiner.*

A. L. BRODY, *Assistant Examiner.*